HEAT SEALING DEVICE
Filed Feb. 1?, 1969 2 Sheets-Sheet 1
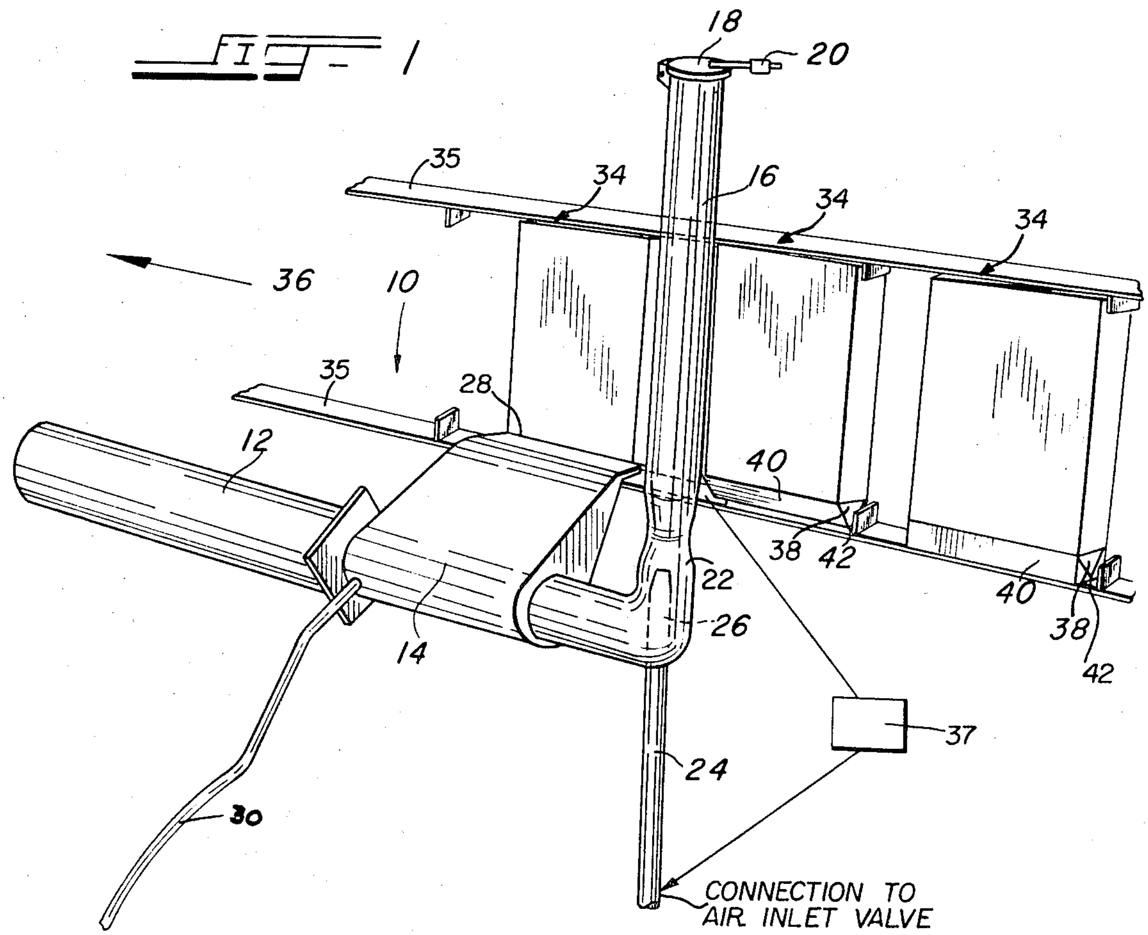
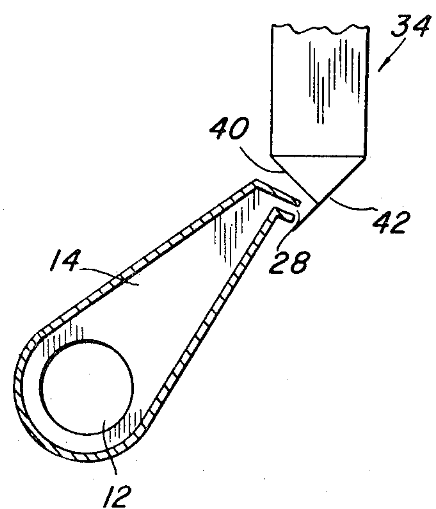
INVENTORS
RALPH O. VUILLEUMIER
GIULIO B. BAGNATORI
BY Carpenter, Ostis & Lindberg
ATTYS.

HEAT SEALING DEVICE
Filed Feb. 17, 1969 2 Sheets-Sheet 2
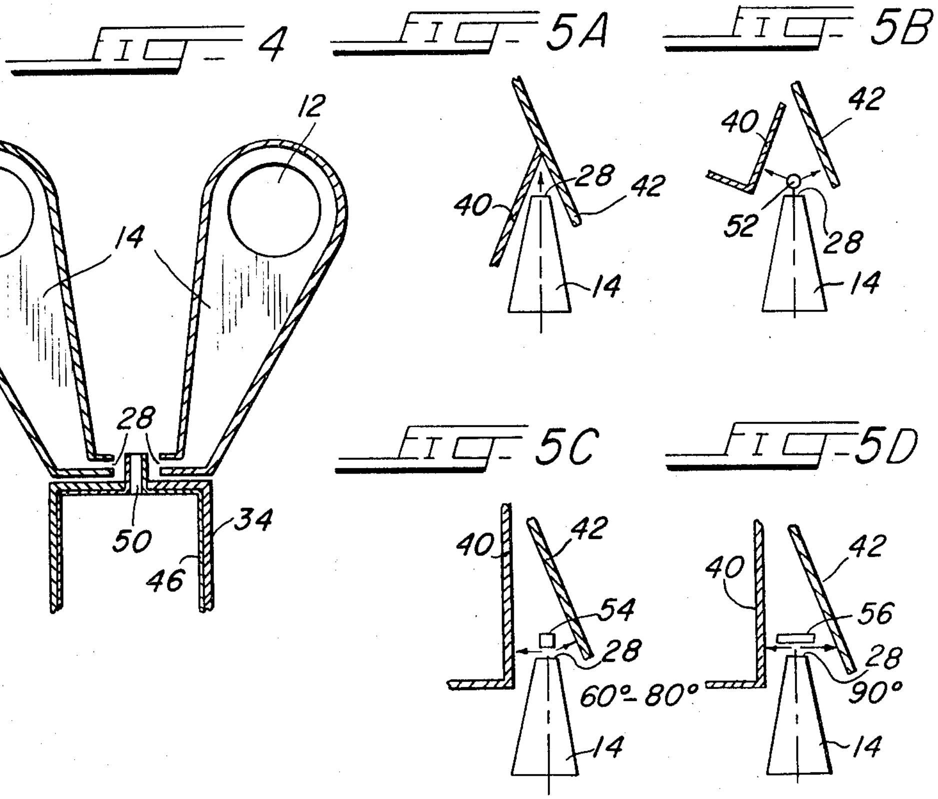
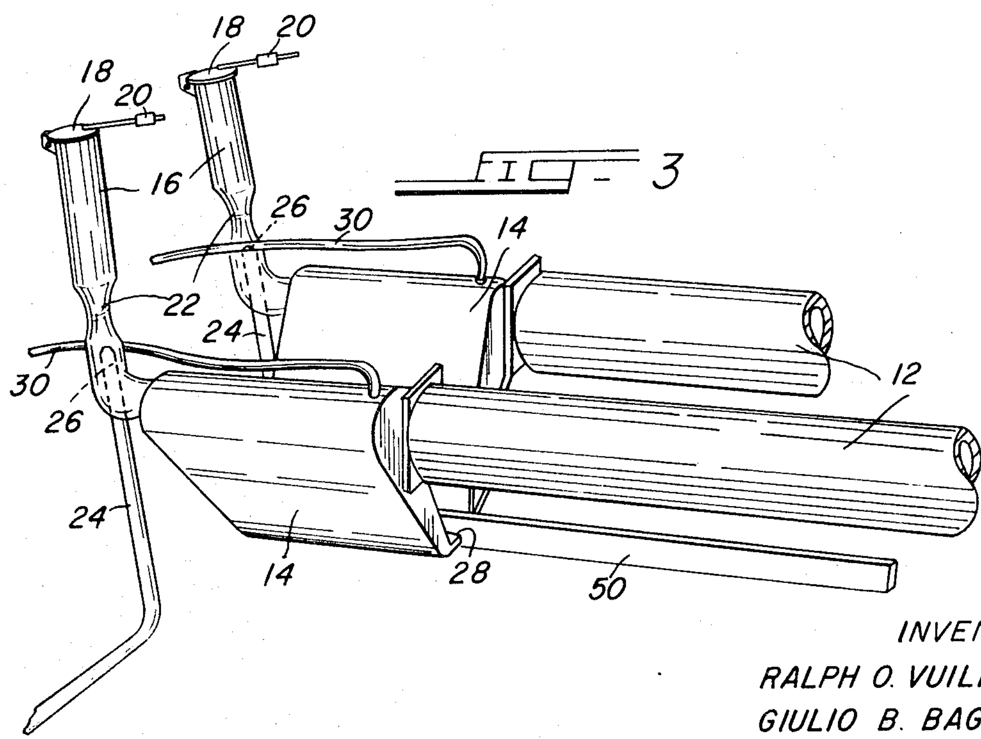
INVENTORS
RALPH O. VUILLEUMIER
GIULIO B. BAGNATORI
BY Carpenter, Ostis & Lindberg
ATTYS
ARO.

United States Patent Office 3,562,920

Patented Feb. 16, 1971

3,562,920

HEAT SEALING DEVICE

Ralph O. Vuilleumier, Malvern, Pa., and Giulio B. Bagnatori, Wilmington, Del., assignors to Container Corporation of America, Chicago, Ill., a corporation of Delaware Filed Feb. 17, 1969, Ser. No. 799,825
Int. Cl. F26b *19/00*
U.S. Cl. 34—48 7 Claims

ABSTRACT OF THE DISCLOSURE

In a machine for bonding selected surfaces of a container formed from paper, a device for supplying heated air against a selected surface to be bonded comprises nozzle means for directing heated air against such surface, means for supplying heated air to the nozzle means, a conduit connected at one end to the nozzle means and having a normally closed valve spaced from that end, a conveyor for carrying the containers past said nozzle means, and means responsive to stopping the conveyor for opening the valve to divert heated air from said nozzle means through said conduit into the atmosphere thereby preventing overheating of containers positioned on the conveyor adjacent the nozzle means.

BACKGROUND OF THE INVENTION

(1) Field of the invention

This invention relates to a device used with a paperboard container closing or sealing machine, or the like, and, more particularly, to a device adapted to supply heated air to selected surfaces of a container for activating the adhesive coating on the surfaces thereof when the machine is in operation, and for diverting the heated air away from the container surfaces, when the machine is stopped, thereby preventing overheating of the containers.

(2) The prior art

It is a general practice in the paperboard container manufacturing art to coat one or more container surfaces to be closed with heat-activatable adhesive prior to closing the container on a closing, sealing, or similar machine. Thus it becomes necessary to supply various amounts of heat or heated air against the surfaces of a container to activate the adhesive coating.

With the equipment available in the present day art, difficulties have been experienced in cases of jams of containers in the container-closing machine. When the container-closing machine stops, due to a jam of containers, or the like, some efficient means must be provided to prevent the heated air from contacting the surfaces of the container since otherwise, a substantial danger of fire is presented. The prior art discloses a number of means designed to cut the heated air supply from the container surfaces when the machine is stopped. Generally, these means utilize movement of a portion of the device supplying the heated air, away from the containers during the machine stoppage. Such devices are costly, complicated and in some cases require a long time before they are operative. Since time is of great importance in preventing overheating of containers which may possibly catch on fire, a simple, efficient and fast device has become necessary.

SUMMARY OF THE INVENTION

The present invention overcomes the disadvantages of the prior art and provides a device which is simple, yet efficient, and which is capable of diverting the flow of heated air away from container surfaces when the container-closing machine is stopped so as to prevent overheating of containers. Generally, the device of the present invention is incorporated into a container-closing machine which has a conveyor on which containers are being carried through the machine. Container surfaces to be closed are usually supplied with a coating of adhesive which must be activated by heat before it becomes effective. The device of the present invention comprises nozzle means for directing heated air against selected surface or surfaces of a container as the container is being carried past the nozzle means by a conveyor of a container-closing machine. Means are also provided for supplying heated air to the nozzle means, while at the opposite end of the nozzle means there is connected a conduit member having a normally closed valve at its end. This valve is opened in response to stopping of the conveyor to divert the heated air being supplied to the nozzle means away from the containers and through the now opened valve into the atmosphere. The device is also susceptible to variations and modifications whereby the air flow in the device can be reversed during stopping of the machine so that instead of heated air being forced against the surfaces of containers, shop air is made to flow into the nozzle means in a reverse order blocking the exit of heated air.

DRAWINGS

FIG. 1 is a perspective view of the device of the present invention illustrating the relationship between the device and the containers passing the nozzle orifice;

FIG. 2 is a sectional elevational view illustrating the relationship between the nozzle means of the present device and the container in the path of heated air;

FIG. 3 is a perspective view of a pair of devices of the present invention positioned on two opposite sides of a container carrying conveyor;

FIG. 4 is a sectional elevational view of a portion of the device shown in FIG. 3 and illustrating the relationship between nozzle means of the device and a container;

FIG. 5A shows an unrestricted orifice of a nozzle of the present device; and

FIGS. 5B, 5C, and 5D, illustrate restricted orifices adapted to channel the heated air to specific points on the surfaces of the container.

SPECIFICATION

While this invention is susceptible of embodiment in many different forms, there are shown in the drawings and will herein be described in detail, embodiments of the invention with the understanding that the present disclosure is to be considered as an exemplification of the principles of the invention and is not intended to limit the invention to the embodiments illustrated. The scope of the invention will be pointed out in the appended claims.

Referring now to FIG. 1, there is shown a heat-sealing device generally designated 10. The device generally comprises a heater element 12 connected to nozzle means 14 for the purpose of supplying heated air thereto. Connected to the opposite side of the nozzle means 14, there is a conduit member 16 which has a normally closed flapper valve 18 at its end removed from the nozzle means 14. The flapper valve 18 is provided with a counterbalance 20 to prevent opening thereof during normal machine operations, as explained in detail hereinafter. The conduit member 16 has a reduced cross-section 22 located between the nozzle means 14 and the valve 18 for the purpose of increasing the velocity of air travelling through the conduit 16 when the valve 18 is opened.

A tubing 24 is connected to the conduit 16 in such a fashion that a tip 26 thereof is located within the conduit 16 at the approximate location of the beginning of reduced cross-section 22. The purpose of the tubing 24 is to supply compressed air into the conduit 16 at a desired time in order to overcome the effect of the counterbalance 20 and open the flapper valve 18.

To determine proper temperature of the heated air passing from the heater 12 into the nozzle means 14 and through an orifice 28 thereof, a thermocouple, or the like, is inserted into the nozzle means 14 through the connecting tube 30.

A plurality of paperboard containers 34 or the like, is being conveyed by a conveyor 35 of the container-closing machine (not shown) in a direction, generally indicated at 36, past the orifice 28 of the nozzle means 14.

The container 34 shown herein is formed with a double bellows end 38 and has an inner major flap 40 and an outer major flap 42 foldably connected to the side walls of the container. In the container manufacturing practice, the outer surface of the flap 40 and the inner surface of the flap 42, or either of them, are coated with heat activatable sealable coating, or the like, which becomes operative upon being subjected to a predetermined amount of heat.

Assuming, for the purposes of illustration, that the outer surface of flap 40 and the inner surface of flap 42 have been coated with heat activatable adhesive, or the like, it will be seen from FIG. 2, that, as the container 34 is being conveyed past the orifice 28, the flaps will be subjected to flow of heated air coming from the orifice 28 of the nozzle means 14. The temperature of the heated air is continuously checked by a thermocouple inserted into the nozzle means 14 through the tubing 30 heretofore described.

When the conveyor stops, the container positioned adjacent the orifice 28 will be subjected to an excessive amount of heat. While the temperature of the heated air might be proper when the heated air is forced against surfaces of moving containers, it may be too high for application against the surfaces of stationary containers and may cause such stationary containers to catch on fire. This is particularly true in case of container jam ups in the container-closing machine. To prevent overheating of the containers, compressed air supply is activated, responsive to stopping of the conveyor of the closing machine, to force compressed air through the tubing 24 and out the tip 26 into the conduit 16 where the velocity of air is increased due to the cross-sectional reduction 22 so that the air which had been substantially motionless in the conduit 16 is combined with the incoming compressed air and moved against the flapper valve 18 with sufficient force to overcome the counterbalance 20 and cause the valve 18 to be opened. The flow of compressed air in the tubing 24 may be activated by conventional means known in the art, such as a sensing switch 37 connected between the conveyor 35 and an inlet valve (not shown) of the tubing 24. The switch operates to open said inlet valve upon sensing that the conveyor 35 has stopped. When the valve is opened the air passing from the heater 12 into the nozzle means 14 will enter the conduit 16 and will go out through the open valve 18 thereby being diverted from the orifice 28 and from the surfaces of containers stopped adjacent to the orifice. Thus, when the machine is stopped, the flow of hot air through the device is from the heater 12 through the nozzle means 14, through the conduit member 16 and out into the atmosphere through the open valve 18. As an additional feature, the air flow may be regulated in such a manner as to create reverse flow whereby shop air enters the orifice 28 and then continues into the nozzle means 14 in a reverse order. Also, a very slight flow of hot air may be provided out the orifice 28 so as to keep the orifice and the nozzle means substantially warm and prevent its cooling down if there is a long delay before the conveyor and the container-closing machine is again restarted. Since the conduit member 16 is downstream from the temperature sensing thermocouple, it does not affect normal operation of the heater or the supply of heated air to the nozzle means when the machine is in operation. Upon restarting of the closing machine, the flow of compressed air is stopped and the flapper valve 18 is closed. Therefore. immediately upon restarting of the machine after a shut down, heated air can again be supplied through the nozzle means 14 and out the orifice 28.

Referring now to FIG. 3, there is shown an arrangement where a pair of devices, identical to the device heretofore described, is positioned on both sides of a conveyor (not shown). As seen in FIGS. 3 and 4, the heated air is supplied in the same manner as heretofore described in connection with FIGS. 1 and 2, but here, it is forced against a liner 46 located within a container 34 in order to supply heat to activate an adhesive coating on the liner and to provide for future closing of the liner side seam 50.

Referring now to FIGS. 5A through 5D there are shown various exemplary orifices.

FIG. 5A illustrates the basic, unrestricted orifice 28 which conducts the heated air in the direction of the arrow. Effective heat sealing is closely related to the position of container flaps to be contacted by the heated air and the direction of air impinging on these flaps, or surfaces. The basic orifice illustrated in FIG. 5A consists of a number of colinear slots or of a single slot which forms a sheet of air flowing in the direction of the center line of the orifice. In some instances it is necessary to form two sheets of air at some angle from the center line of the orifice. Restrictions, such as rods of various shapes, are positioned in front of the orifice 28 and attached thereto by conventional means, to vary the angle of air flow from 0° to 90° depending upon specific container design. Heretofore, it had been a custom to design a specific nozzle means and orifice for each specific configuration of a container. Thus, if the design of the container changed, a new orifice and nozzle means had to be built. The various restrictions illustrated in FIGS. 5B through 5D eliminate the requirement of constructing different orifices for different configurations of containers, since orifices may be "customized" by use of appropriate restrictions as dictated by container design.

In FIG. 5B there is shown a restriction or rod 52 which is attached to the orifice 28 by conventional means (not shown) and positioned in front of it so as to force the heated air against the flaps of the container at an angle from 10° to 30°.

FIG. 5C illustrates a restriction 54 which causes the air to flow at angles of 60° to 80°.

FIG. 5D illustrates the restriction 56 which substantially obstructs a direct flow of air from the orifice 28 in a straightforward direction and causes the air to flow at an angle of 90°. Arrows in FIGS. 5A through 5D illustrate various air flows possible with utilization of exemplary restrictions heretofore described.

We claim:

1. In a machine for bonding selected surfaces of a container formed from paper, or the like, and having at least one of said surfaces coated with heat activatable adhesive, a device for supplying heated air against said coated surface for activating said adhesive comprising:

(a) nozzle means having an orifice for directing heated air against an adhesive coated surface of a container;

(b) a heater operatively connected to said nozzle means for supplying heated air thereto;

(c) a conduit member connected at one end to said nozzle means and having a normally closed valve spaced from said one end;

(d) a conveyor for carrying the containers past said orifice;

(e) means responsive to stopping of said conveyor for opening said valve to divert heated air from said nozzle means through said conduit into the atmosphere thereby preventing overheating of containers positioned on said conveyor adjacent said orifice.

2. In a machine for bonding selected surfaces of a container, formed from paper or the like, a device for supplying heated air against at least one surface to be bonded, comprising:

(a) nozzle means for directed heated air against a surface of a container;

(b) means for supplying heated air to said nozzle means;

(c) a conduit member connected at one end to said nozzle means and having a normally closed valve spaced from said one end;

(d) a conveyor for carrying the containers past said nozzle means;

(e) means responsive to stopping of said conveyor for opening said valve to divert heated air from said nozzle means through said conduit into the atmosphere thereby preventing overheating of containers positioned on said conveyor adjacent said nozzle means.

3. A device as defined in claim 2, wherein the cross-section of said conduit member is reduced at a location inward of said valve for increasing the velocity of air flowing in said conduit.

4. A device as defined in claim 2, wherein said means for opening said valve comprises a tubing connected to said conduit and being operative upon stopping of said conveyor to convey compressed air into said conduit for assisting in opening of said valve.

5. A device as defined in claim 2, wherein said means for supplying heated air to said nozzle means comprises a heater unit operatively connected to said nozzle means and being adapted to convey heated air into said nozzle means.

6. A device as defined in claim 2, wherein said nozzle means has an orifice for directing air against said surface of said containers.

7. A device as defined in claim 6, wherein said orifice has a deflector connected thereto and positioned adjacent the surface of the container to be bonded for channeling air against said surface.

References Cited

UNITED STATES PATENTS

| | | | |
|---|---|---|---|
| 2,423,237 | 7/1947 | Haslacher | 156—497X |
| 3,226,278 | 12/1965 | Scofield et al. | 156—497 |
| 3,416,411 | 12/1968 | Hittenberger et al. | 156—497X |

CARROLL B. DORITY, Jr., Primary Examiner

U.S. Cl. X.R.

156—497